United States Patent
Hoshi

(10) Patent No.: US 6,788,877 B1
(45) Date of Patent: Sep. 7, 2004

(54) RECORDING AND REPRODUCING APPARATUS

(75) Inventor: Hidenori Hoshi, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 991 days.

(21) Appl. No.: 09/609,658

(22) Filed: Jun. 30, 2000

(30) Foreign Application Priority Data

Jul. 5, 1999 (JP) .......................................... 11-190354

(51) Int. Cl.[7] .............................................. H04N 5/91
(52) U.S. Cl. ........................ 386/67; 386/116; 386/124; 386/117; 386/81; 360/32
(58) Field of Search ........................... 386/68, 67, 109, 386/112, 113–116, 124, 81, 117; 360/32; H04N 5/91

(56) References Cited

U.S. PATENT DOCUMENTS

| | | | | |
|---|---|---|---|---|
| 5,041,925 A | * | 8/1991 | Yamamoto et al. | 386/81 |
| 5,359,428 A | * | 10/1994 | Kubota et al. | 386/33 |
| 5,377,050 A | * | 12/1994 | Yun | 360/32 |
| 5,530,598 A | * | 6/1996 | Arai et al. | 386/112 |
| 6,137,951 A | * | 10/2000 | Kawai et al. | 386/87 |

* cited by examiner

*Primary Examiner*—Vincent Boccio
(74) *Attorney, Agent, or Firm*—Robin, Blecker & Daley

(57) ABSTRACT

A recording and reproducing apparatus includes a recording block for recording, on a recording medium, image data and error information indicative of presence or absence of any error in the image data, a reproducing block for reproducing the image data and the error information from the recording medium, an interpolating block for interpolating the reproduced image data on the basis of the reproduced error information, a mode change-over block for changing over a recording mode between a first recording mode in which the image data and the error information are recorded while the recording medium is transported at a first speed and a second recording mode in which the image data and the error information are recorded while the recording medium is transported at a second speed different from the first speed, and a control block for controlling and causing, in response to the change-over of the recording mode, the recording block to record the error information indicative of the presence of any error together with the image data for a predetermined period of time.

19 Claims, 9 Drawing Sheets

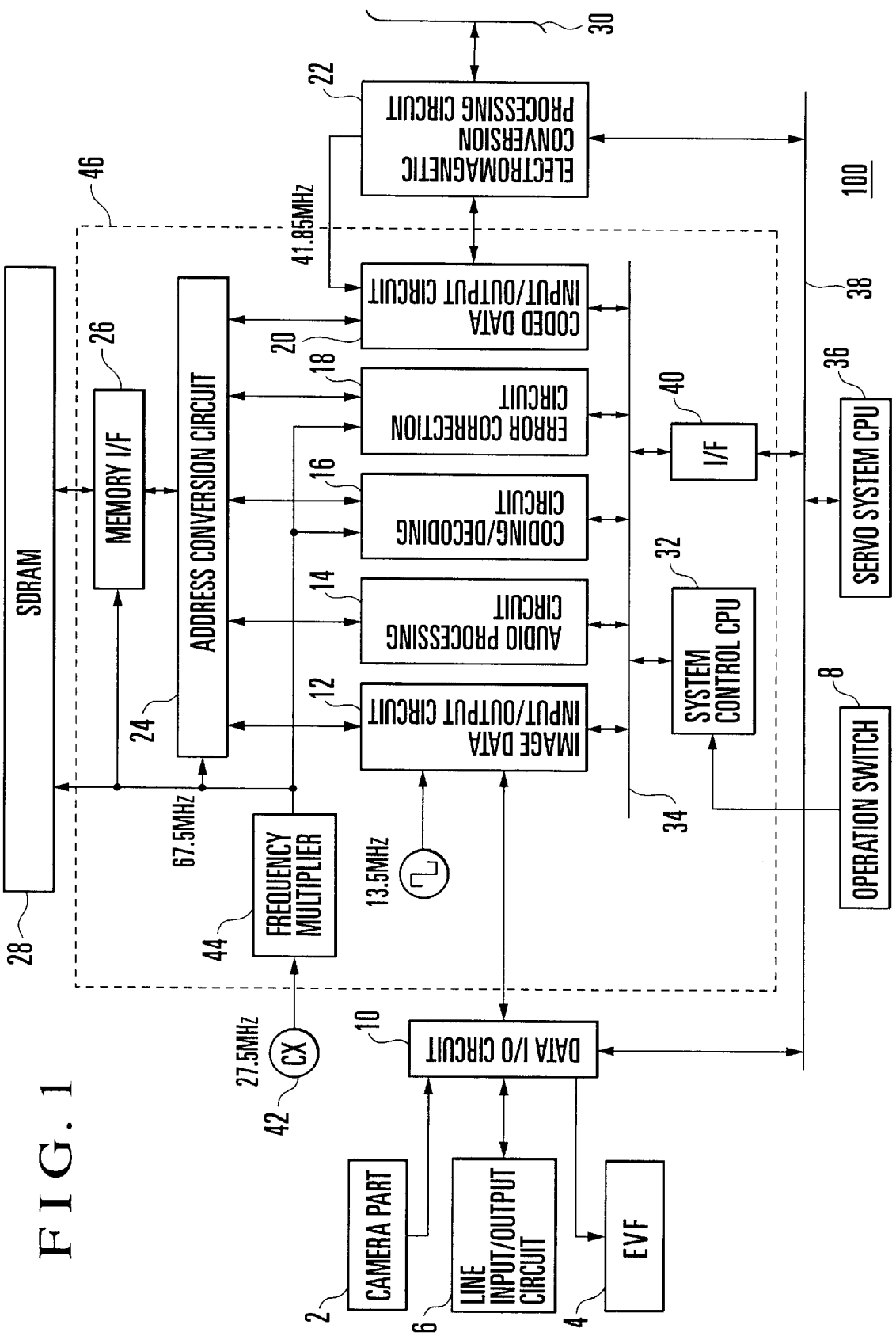
F I G. 1

FIG. 9

| BLOCK | Frame0 | Frame1 | Frame2 |
|---|---|---|---|
| CODE DATA INPUT/OUTPUT AND ERROR CORRECTION | 0 | 1 | 2 |
| ORDINARY PROCESSING OF CODING/DECODING | 2 | 0 | 1 |
| INTERPOLATION PROCESSING OF CODING/DECODING | 1 | 2 | 0 |

RECORDING AND REPRODUCING APPARATUS

BACKGROUND OF THE INVENTION

1. Field of the Invention

The present invention relates to a recording and reproducing apparatus, and more particularly to an apparatus arranged to record and reproduce digital image data and additional data.

2. Description of Related Art

In transmitting a large amount of digital data, it is generally practiced to compressively code the digital data so that the transmission can be made at a relatively low transmission rate.

For example, a digital video cassette recorder (VCR) which records and reproduces image data on and from a magnetic tape as digital data is arranged to compress digital image data of a data rate of, say, about 124 Mbps to a data rate of about 25 Mbps which is about one fifth of the original data rate and to record the compressed digital image data on the magnetic tape.

The digital VCR is arranged to compress the amount of information of digital image data by carrying out a DCT (discrete cosine transform) process on the digital image data, quantizing the DCT-processed image data, and variable-length-coding the quantized image data. The step of quantizing the image data is arranged to be variable on the basis of parameters of varied kinds. Further, the data rate is controlled in such a way as to make the amount of codes constant after the process of the variable-length coding.

Among the digital VCRs of this kind, consumer-used digital VCRs arranged to operate on a format prescribed for the HD-Digital VCR Conference have a standard recording-and-reproducing mode (hereinafter referred to as "SD mode") and a long-time recording-and-reproducing mode (hereinafter referred to as "SDL mode").

In the SDL mode, the number of pixels in the horizontal direction is thinned down to ¾ of that in the SD mode by adaptively varying the sampling frequency of image data, and the image data is compressively coded at a compressing rate which is 1.5 times as much as the compressing rate of the SD mode. Further, the travel (transport) speed of the tape for recording and reproduction of the SDL mode also differs from that of the SD mode. Therefore, the SD mode and the SDL mode also differ in inclination of recording tracks formed on the magnetic tape.

Therefore, when changing the recording mode from the SD mode over to the SDL mode in recording digital image data on the magnetic tape, a part of a track recorded in the SD mode is apt to be overwritten with a track recorded in the SDL mode at a mode transition part of the recording tape where the change-over of the recording mode takes place.

Further, since the inclination of tracks on the magnetic tape changes at the mode transition part, the conventional digital VCRs are arranged such that, in reproducing a signal from a magnetic tape having the SD mode and the SDL mode commingled, detection of the mode transition takes some length of time. Then, during such mode transition detecting time, an attempt is apt to be made to reproduce in the SD mode a signal recorded in the SDL mode.

As a result, reproduced data comes to include many errors to greatly deteriorate the quality of an image reproduced.

BRIEF SUMMARY OF THE INVENTION

The invention is directed to the solution of the problem of the prior art described above. Therefore, it is an object of the invention to prevent a reproduced image from deteriorating, even when reproducing image data recorded in different recording modes.

To attain the above object, in accordance with an aspect of the invention, there is provided a recording and reproducing apparatus, which comprises recording means for recording, on a recording medium, image data and error information indicative of presence or absence of any error in the image data, reproducing means for reproducing the image data and the error information from the recording medium, interpolating means for interpolating the reproduced image data on the basis of the error information reproduced by the reproducing means, mode change-over means for changing over a recording mode between a first recording mode in which the recording means records the image data and the error information while transporting the recording medium at a first speed and a second recording mode in which the recording means records the image data and the error information while transporting the recording medium at a second speed different from the first speed, and control means for controlling and causing, in response to the change-over of the recording mode effected by the mode change-over means, the recording means to record the error information indicative of the presence of any error together with the image data for a predetermined period of time.

It is another object of the invention to give an adequate reproduced image even at the time of the change-over of the recording mode.

These and further objects and features of the invention will become apparent from the following detailed description of a preferred embodiment thereof taken in connection with the accompanying drawings.

BRIEF DESCRIPTION OF THE SEVERAL VIEWS OF THE DRAWING

FIG. 1 is a block diagram showing the arrangement of a digital VCR to which the invention is applied.

FIG. 9 is a table showing the phase relation of addresses of the memory banks BK0, BK1 and BK2 shown in FIG. 7.

DETAILED DESCRIPTION OF THE INVENTION

Figure 2:
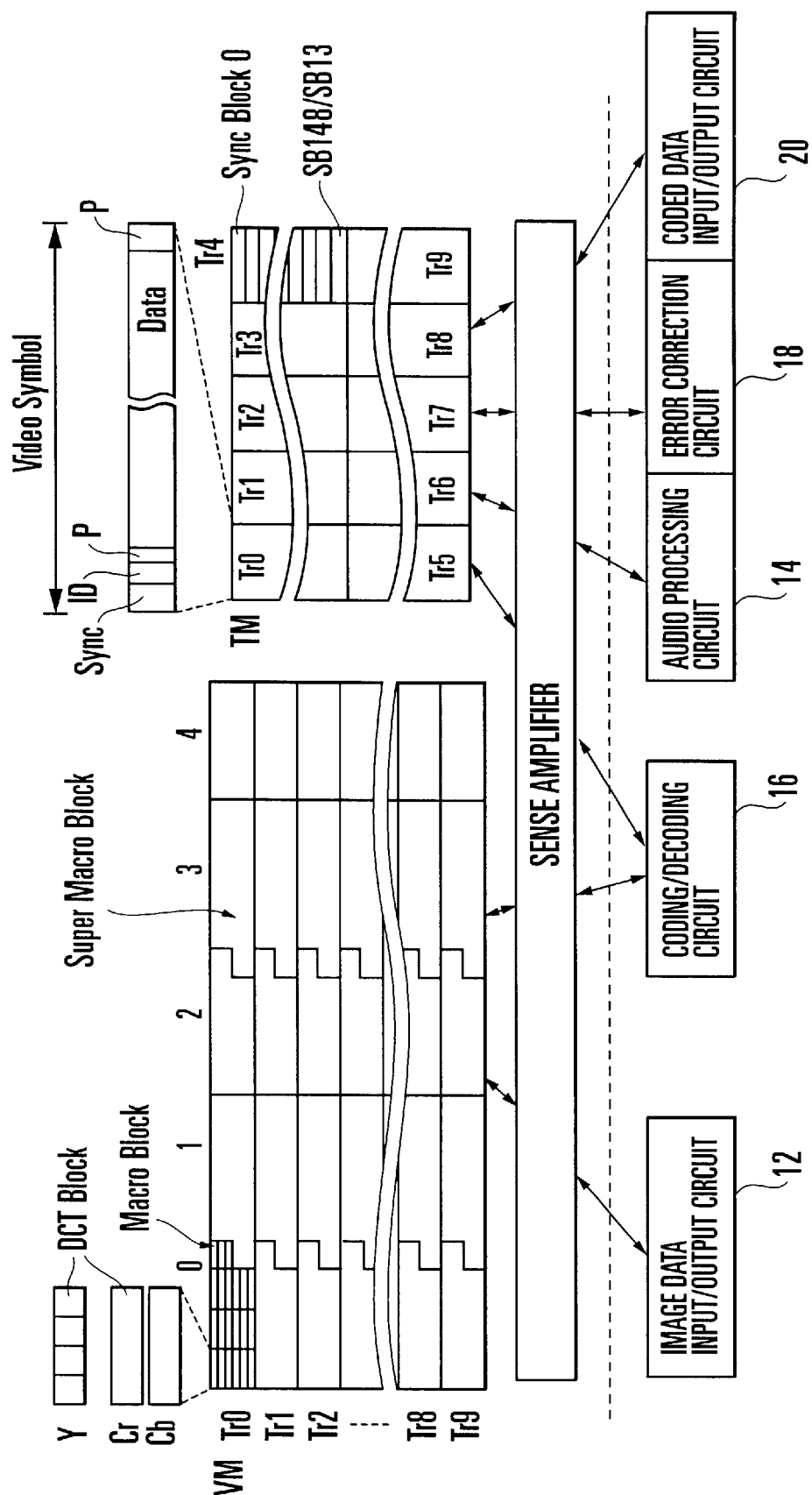
FIG. 2 is a diagram conceptually showing a memory space.

Hereinafter, a preferred embodiment of the invention will be described in detail with reference to the drawings.

FIG. 1 is a block diagram showing in outline the arrangement of a digital VCR 100 to which the invention is applied. Referring to FIG. 1, a camera part 2 is composed of a known CCD and a camera signal processing circuit. An EVF (electronic viewfinder) 4 is arranged to display an image based on image data obtained by the camera part 2 or an image based on reproduced image data. A line input/output circuit 6 is arranged to input and output image data and audio data from and to an external apparatus. An operation switch part 8 includes various switches for recording, reproduction, etc., and a change-over switch for change-over of the recording mode of the VCR, as will be described later herein. A data I/O circuit 10 is arranged to receive data from the camera part 2, to send data to the EVF 4 and to receive and send input and output data from and to the line input/output circuit 6. An image data input/output circuit 12 is arranged to perform various processes such as a Y/C separating process, etc., on input data and to perform various processes such as a process of adding a synchronizing signal to output data. An audio processing circuit 14 is arranged to process audio signals. A coding/decoding circuit 16 is arranged to perform a discrete cosine transform (DCT) process on image data and to code and decode the image data by carrying out a quantizing process and a variable-length coding process. An error correction circuit 18 is arranged to correct errors. A coded data input/output circuit 20 is arranged to process coded image data and audio data into a prescribed tape format by adding additional data of varied kinds during recording, and to inversely convert the coded data during reproduction. An electromagnetic conversion processing circuit 22 is arranged to record and reproduce data by scanning a tape 30 with a rotary head in such a way as to form many tracks on the tape 30.

The image data input/output circuit 12, the audio processing circuit 14, the coding/decoding circuit 16, the error correction circuit 18 and the coded data input/output circuit 20 are arranged to exchange data with a memory 28 through an address conversion circuit 24 and a memory interface (I/F) 26.

A system control CPU 32 is arranged to control, through a CPU bus 34, the actions of the image data input/output circuit 12, the audio processing circuit 14, the coding/decoding circuit 16, the error correction circuit 18 and the coded data input/output circuit 20. A servo system CPU 36 is arranged to control the data I/O circuit 10 through a CPU bus 38, and to control the image data input/output circuit 12, the audio processing circuit 14, the coding/decoding circuit 16, the error correction circuit 18 and the coded data input/output circuit 20 through the CPU bus 38, an interface (I/F) 40 and the CPU bus 34.

As will be described in detail later herein, in the present embodiment, each of the image data input/output circuit 12, the audio processing circuit 14, the coding/decoding circuit 16, the error correction circuit 18 and the coded data input/output circuit 20 is arranged to gain access to the memory 28 at a desired timing, under the control of the system control CPU 32 and the servo system CPU 36, while a memory control circuit which is not shown is arranged to adjust and control requests made from these circuits for access to the memory 28.

Each of the image data input/output circuit 12, the audio processing circuit 14, the coding/decoding circuit 16, the error correction circuit 18 and the coded data input/output circuit 20 is capable of processing, in real time, image data and audio data of the SD (standard definition). Further, with such processing circuits arranged in parallel to receive and process the image data and audio data in a time sharing manner, processing in real time becomes possible even in a case where image data and audio data are arranged for HD (high definition) recording to have a data amount per frame twice as much as the data amount of the SD image data.

The memory 28 is an SDRAM (synchronous-dynamic RAM) which is capable of making burst transmission of data in synchronism with the rise of a clock signal. An oscillator 42 which has no jitter is arranged to output a clock signal of, say, 27.5 MHz. The clock signal is supplied to a frequency multiplier 44. The frequency multiplier 44 forms a reference clock signal of 67.5 MHz by stepping up the input clock signal. The reference clock signal is supplied to the coding/decoding circuit 16, the error correction circuit 18, the address conversion circuit 24, the memory interface (I/F) 26 and the memory 28. The frequency 67.5 MHz of the reference clock signal (MCLK) is an integer (five) times as much as 13.5 MHz which is locked to a horizontal synchronizing signal H_Sync formed by the oscillator 42.

FIG. 2 conceptually shows the storage space of the memory 28. The memory 28 is composed of a video memory (VM) area having a capacity of storing a two-frame amount of image data and audio data, and a track memory (TM) area having a capacity of storing a three-frame amount of coded image data and audio data with some other additional data.

The memory cells of each of these areas VM and TM are arranged to be settable in a writing mode or a reading mode for every frame. In accordance with the processing mode, the image data input/output circuit 12, the audio processing circuit 14, the coding/decoding circuit 16, the error correction circuit 18 and the coded data input/output circuit 20 send or receive data to or from the VM area or the TM area through a sense amplifier.

In other words, as shown in FIG. 2, the image data input/output circuit 12 is arranged to send and receive data to and from the VM area only. The coding/decoding circuit 16 is arranged to send and receive data to and from both the VM area and the TM area. More specifically, in coding, the coding/decoding circuit 16 reads data from the VM area to perform a coding process and writes the coded data into the TM area. In decoding, the coding/decoding circuit 16 reads data from the TM area to decode the data and writes the decoded data into the VM area.

The audio processing circuit 14, the error correction circuit 18 and the coded data input/output circuit 20 likewise exchange data with the TM area only.

In the VM area, image data (Y, Cr and Cb) before coding is written in units of pixel. The image data, which is composed of "720 pixels in the horizonal direction"x"480 pixels in the vertical direction" per frame in the case of the SD mode of the NTSC system, is divided into 50 super macro blocks (hereinafter referred to as SMBs), i.e., "five blocks in the horizontal direction"x"ten blocks in the vertical direction". Each of the SMBs is composed of 27 macro blocks (hereinafter referred to as MBs). Each of the MBs is composed of four DCT blocks of luminance data and one DCT block of each of color-difference data of two kinds. Each of the DCT blocks is composed of "8x8 " pixels.

In recording video data of the NTSC system in the SD mode, image data and audio data for one frame are recorded over ten tracks on a magnetic tape after the data are coded by a coding process. Data of five SMBs arrayed in the horizontal direction, as shown in FIG. 2, in the image data before coding are recorded in one track on the tape 30. Incidentally, in a case where the video data is to be recorded by the PAL system in the SD mode, 12 tracks are used in recording image and audio data for one frame.

Therefore, it is convenient to use, for access to the VM area, an address formed to include values h and v corresponding respectively to positions in the horizontal and vertical directions of each pixel, a track number Tr, an SMB number within each track, an MB number within each SMB and a DCT block number within each MB.

In the TM area, coded image data, an error correction code, etc., are stored at storage positions corresponding to the above-stated ten tracks (or 12 tracks in the case of the PAL system). In an area corresponding to each track, 149 synchronous blocks (hereinafter referred to as SBs) are stored. In addition to the image data, audio data, its error correction data, etc., are also stored at positions within the TM area corresponding to ten (or 12, for the PAL system) tracks independently of the image data, although the audio data is not shown in FIG. 2. For the audio data, 14 SBs are stored in an area corresponding to each track.

Each of the synchronous blocks of image data and audio data is composed of synchronizing data indicative of the leader part of the synchronous block, ID data indicative of the address and attribute, etc., of the signal, effective (image/audio) data, and a parity bit. It is, therefore, convenient to use, for forming an address to be used for access to the TM area, a track number Tr, a synchronous block number within each track, and a symbol number within each synchronous block.

Figure 3:
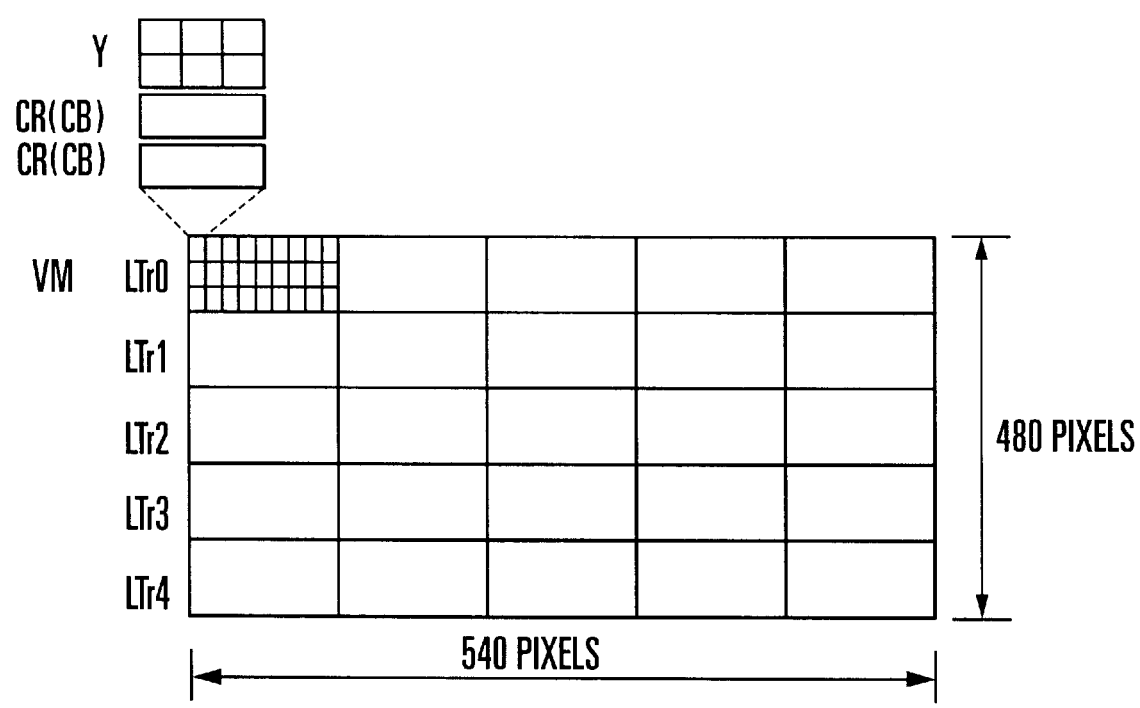
FIG. 3 is a diagram showing the state of image data to be handled by the apparatus shown in FIG. 1.

In recording video data of the NTSC system in the SDL mode, image data composed of "540 pixels in the horizontal direction"×"480 pixels in the vertical direction" per frame is divided, as shown in FIG. 3, into 25 super macro blocks (SMBs), i.e., "five blocks in the horizontal direction"×"five blocks in the vertical direction".

Each of the SMBs is formed to include 27 marco blocks (MBs) each of which is composed of six DCT blocks of luminance data and one DCT block of each of color-difference data of two kinds. One frame amount of image data which has been coded in the above-mentioned manner is distributed and recorded onto five tracks (six tracks in the case of the PAL system in the SDL mode) on the magnetic tape. The details of each macro block (MB) will be described later herein.

The address conversion circuit 24 is arranged to adjust and control the access of each of the processing circuits to the memory 28. More specifically, a command designating one of various operation modes, such as a reproduction mode, a recording mode, etc., is sent from the system control CPU 32 or the servo system CPU 36 to the address conversion circuit 24 through the CPU bus 34. Further, in some cases, an operation mode is designated by a predetermined bit of an address received from the image data input/output circuit 12, the audio processing circuit 14, the coding/decoding circuit 16, the error correction circuit 18 or the coded data input/output circuit 20.

In accordance with the above-stated information, the address conversion circuit 24 manages the order of priority for data transfer, and adjusts and arranges data transfer between the memory 28 and each of the image data input/output circuit 12, the audio processing circuit 14, the coding/decoding circuit 16, the error correction circuit 18 and the coded data input/output circuit 20 in accordance with the access request from this processing circuit.

The system control CPU 32 is arranged to send a command to the address conversion circuit 24 according to an operation mode set by the operation switch part 8. Commands to be sent from the system control CPU 32 correspond to various operation modes, such as a coding mode, a decoding mode, a special reproduction mode, etc. In addition to these commands, the system control CPU 32 provides the address conversion circuit 24 with commands relative to editing actions, such as image combining, after-recording and inserting actions, a dubbing actions, etc.

The address conversion circuit 24 is arranged to form an address for each of the processing circuits in such a way as to permit addressing in optimum data units according to the processing manner of the image data input/output circuit 12, the audio processing circuit 14, the coding/decoding circuit 16, the error correction circuit 18 or the coded data input/output circuit 20 and the address space of the memory 28.

The manner in which the address forming action of the address conversion circuit 24 is performed is variable on the basis of parameters to be sent out from the system control CPU 32 and the servo system CPU 36 according to the type of image data to be processed. For example, the address conversion circuit 24 generates different addresses according to whether the recording mode is the SD mode or the SDL mode and according to the image type (size), such as whether the video data to be processed is of the NTSC system or the PAL system.

The respective processing circuits are supplied with clock signals and arranged to operate in synchronism with the clock signals received. More specifically, the clock signals are formed on the basis of the synchronizing signals Hsync and Vsync extracted from an input signal and internal reference clock pulses or the like, and include a first clock signal (13.5 MHz, in the case of the present embodiment) which is supplied to the image data input/output circuit 12, a second clock signal (not shown) (48 kHz in the case of the present embodiment) which is supplied to the audio processing circuit 14 for audio processing, a third clock signal (67.5 MHz in the case of the present embodiment) which is supplied to the coding/decoding circuit 16, the error correction circuit 18, the address conversion circuit 24, the memory I/F 26 and the memory 28, and a fourth clock signal (41.85 MHz in the case of the present embodiment) which is synchronized with the rotation of a drum and is supplied from the electromagnetic conversion processing circuit 22 to the coded data input/output circuit 20 for recording and reproduction.

In the digital VCR 100 according to the present embodiment, the image data input/output circuit 12, the audio processing circuit 14, the coding/decoding circuit 16, the error correction circuit 18, the coded data input/output circuit 20, the address conversion circuit 24, the memory I/F 26, the system control CPU 32, the interface 40 between buses and the frequency multiplier 44 are integrally formed as a single digital IC 46.

The ordinary recording and reproducing actions of the digital VCR 100 are next described.

The recording action is performed as follows.

When an instruction for recording is given by the operation switch part 8, the system control CPU 32 controls, according to a recording mode set (the SD mode or the SDL mode), the image data input/output circuit 12, the audio processing circuit 14, the coding/decoding circuit 16, the error correction circuit 18, the coded data input/output circuit 20, and sends an instruction, through the bus 34, the I/F 40 and the bus 38, to the servo system CPU 36 to cause a magnetic head provided in the electromagnetic conversion processing circuit 22 to rotate. The system control CPU 32 also controls a tape transport system (not shown) to cause the tape 30 to be transported at a speed according to the recording mode set.

The image data input/output circuit 12 processes image data supplied from the camera part 2 through the data I/O circuit 10 and writes the processed image data into the VM area of the memory 28. The audio processing circuit 14 processes audio data supplied from a microphone (not shown) and writes the processed audio data into the TM area of the memory 28. At this time, an image corresponding to the image data supplied from the camera part 2 is displayed at the EVF 4.

The coding/decoding circuit 16 encodes the image data recorded in the VM area according to the recording mode set and writes the coded image data into the TM area of the memory 28. The error correction circuit 18 performs an error correction coding process by adding parity data to the image data and the audio data written into the TM area of the memory 28. The error correction circuit 18 also performs an error correction coding process on sub-code data generated by a sub-code generating circuit (not shown) and written into the TM area, and writes the processed sub-code data again into the TM area of the memory 28.

Further, in this instance, the system control CPU 32 generates STA data as error information and adds the STA data to the image data, as will be described later herein.

The coded data input/output circuit 20 converts each of coded data written into the TM area into a format required on the tape 30 by adding synchronizing data and ID data to them, and sends the converted data to the electromagnetic conversion processing circuit 22. The electromagnetic conversion processing circuit 22 scans the tape 30 with the rotary magnetic head to record, on the tape 30, the image data, the audio data and the sub-code data coded according to the recording mode set.

The reproducing action of the digital VCR 100 is next described.

When an instruction for reproduction is given by the operation switch part 8, the system control CPU 32 controls the servo system CPU 36 to cause the tape 30 to be transported at a speed corresponding to the predetermined recording mode (the SD mode in this instance). The system control CPU 32 also instructs the respective processing circuits to perform their processes corresponding to the SD mode.

The electromagnetic conversion processing circuit 22 reproduces recorded data by scanning the tracks of the tape 30 with the rotary head.

The coded data input/output circuit 20 detects synchronizing data and ID data included in the reproduced data, and writes the reproduced data into the TM area of the memory 28 at an applicable address according to the ID data. The error correction circuit 18 gains access to the TM area of the memory 28 to correct errors in the reproduced image data, audio data and sub-code data. The error correction circuit 18 then writes the corrected data again into the TM area of the memory 28.

In a case where the recording mode of the data recorded on the tape 30 does not coincide with the mode currently set at the beginning of reproduction, the recorded data cannot be perfectly reproduced. In such a case, the system control CPU 32 detects the recording mode of data currently being reproduced, by detecting recording mode information included in additional information of the image data corrected by the error correction circuit 18. If the result of detection of the recording mode indicates the SD mode, the processes corresponding to the SD mode are allowed to be carried on. If the result of detection of the recording mode indicates the SDL mode, the system control CPU 32 controls the servo system CPU 36 to cause the travel speed of the tape 30 to be changed to a speed corresponding to the SDL mode, i.e., to a speed which is ½ of the tape speed for the SD mode. The system control CPU 32 then gives an instruction to each of the processing circuits to perform a process in a manner corresponding to the SDL mode.

The coding/decoding circuit 16 gains access to the TM area of the memory 28 to read coded image data. The coding/decoding circuit 16 then performs a decoding process on the coded image data, and writes the decoded image data into the VM area of the memory 28. The image data input/output circuit 12 reads the decoded reproduced image data from the VM area of the memory 28, and sends the image data to the EVF 4 and also to an applicable external apparatus through the line input/output circuit 6.

Next, the arrangement of the macro block (MB) and a means for setting an error information signal are described in detail with reference to FIGS. 4 and 5.

Figure 4:
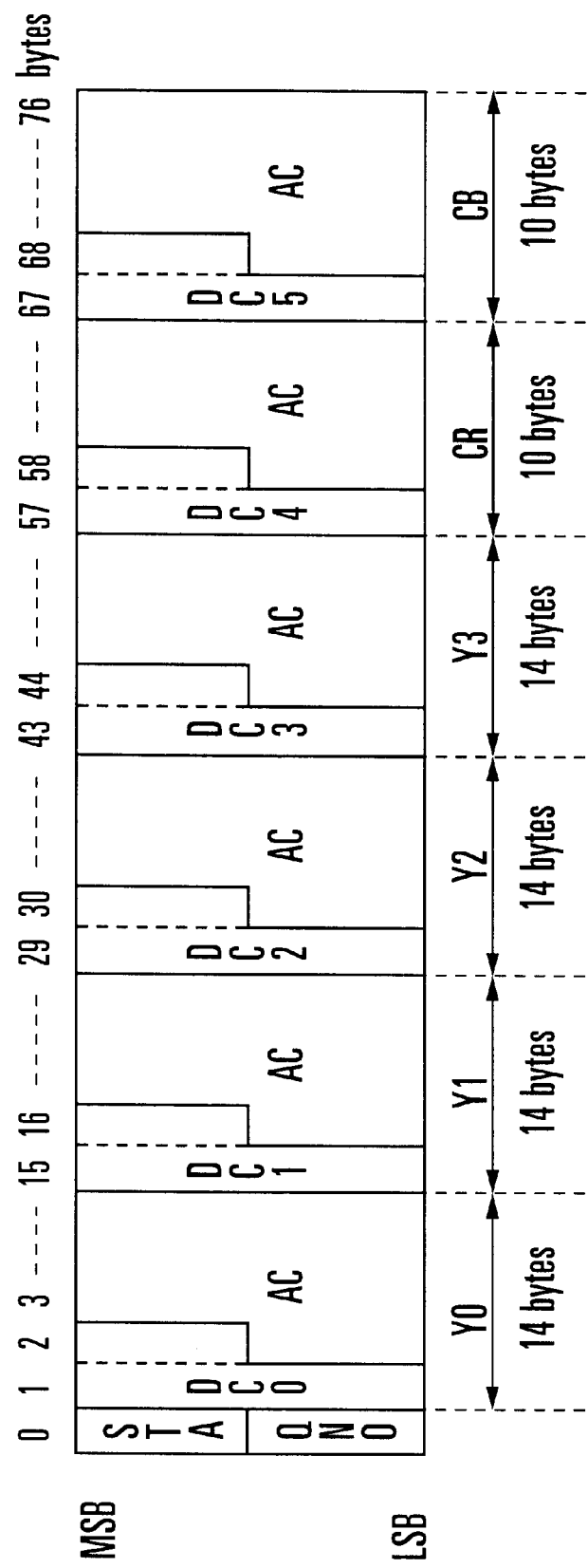
FIG. 4 is a diagram showing the arrangement of data obtained when the apparatus is in the SD mode.

FIG. 4 shows the arrangement of the macro block (MB) in the SD mode. A macro block (MB) of 77 bytes is formed by encoding a total of six DCT blocks including four DCT blocks of luminance data and one DCT block of each of color-difference data of two kinds.

In FIG. 4, symbol STA denotes an error information signal of four bits indicating whether or not any error is included in data of the present MB and, if so, whether or not the data of the present MB has undergone an interpolating process. Symbol QNO denotes a table number of a quantizing table used in quantizing the data of the present MB. Symbols Y0, Y1, Y2 and Y3 denote luminance data which are variable-length-encoded. Symbols CR and CB denote color-difference data which are also variable-length-encoded. Each of the luminance data Y0, Y1, Y2 and Y3 is composed of 14 bytes. Each of the color-difference data CR and CB is composed of 10 bytes. In each of these bytes, 12 bits are allotted to DC data.

Figure 5:
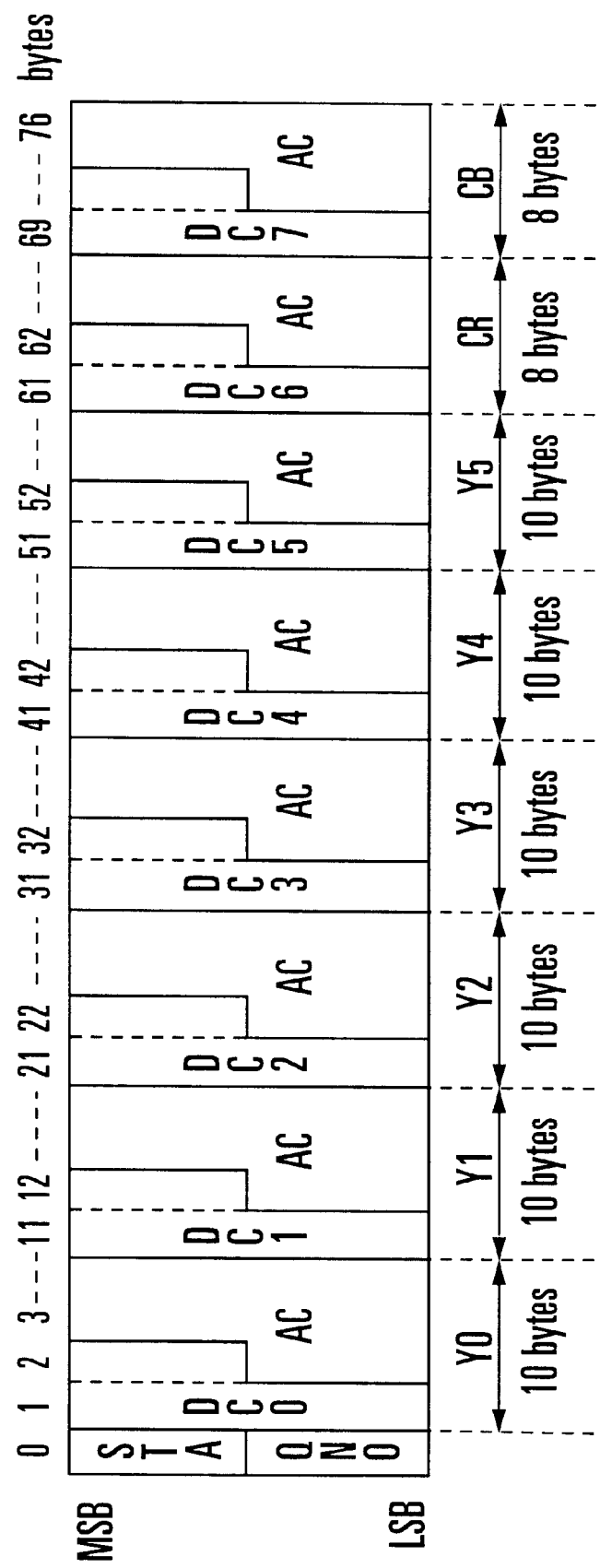
FIG. 5 is a diagram showing the arrangement of data obtained when the apparatus is in the SDL mode.

FIG. 5 shows the arrangement of the macro block (MB) in the SDL mode. A macro block (MB) of 77 bytes is formed by encoding a total of eight DCT blocks including six DCT blocks of luminance data and one DCT block of each of color-difference data of two kinds. In FIG. 5, symbol STA denotes an error information signal of four bits in the same manner as in the case of FIG. 4. Symbol QNO denotes a table number of a quantizing table used in quantizing data of the present MB. Symbols Y0, Y1, Y2, Y3, Y4 and Y5 denote luminance data which are variable-length-encoded. Symbols CR and CB denote color-difference data which are also variable-length-encoded. Each of the luminance data Y0, Y1, Y2, Y3, Y4 and Y5 is composed of 10 bytes. Each of the color-difference data CR and CB is composed of eight bytes. In each of these bytes, 12 bits are allotted to DC data.

Figure 6:
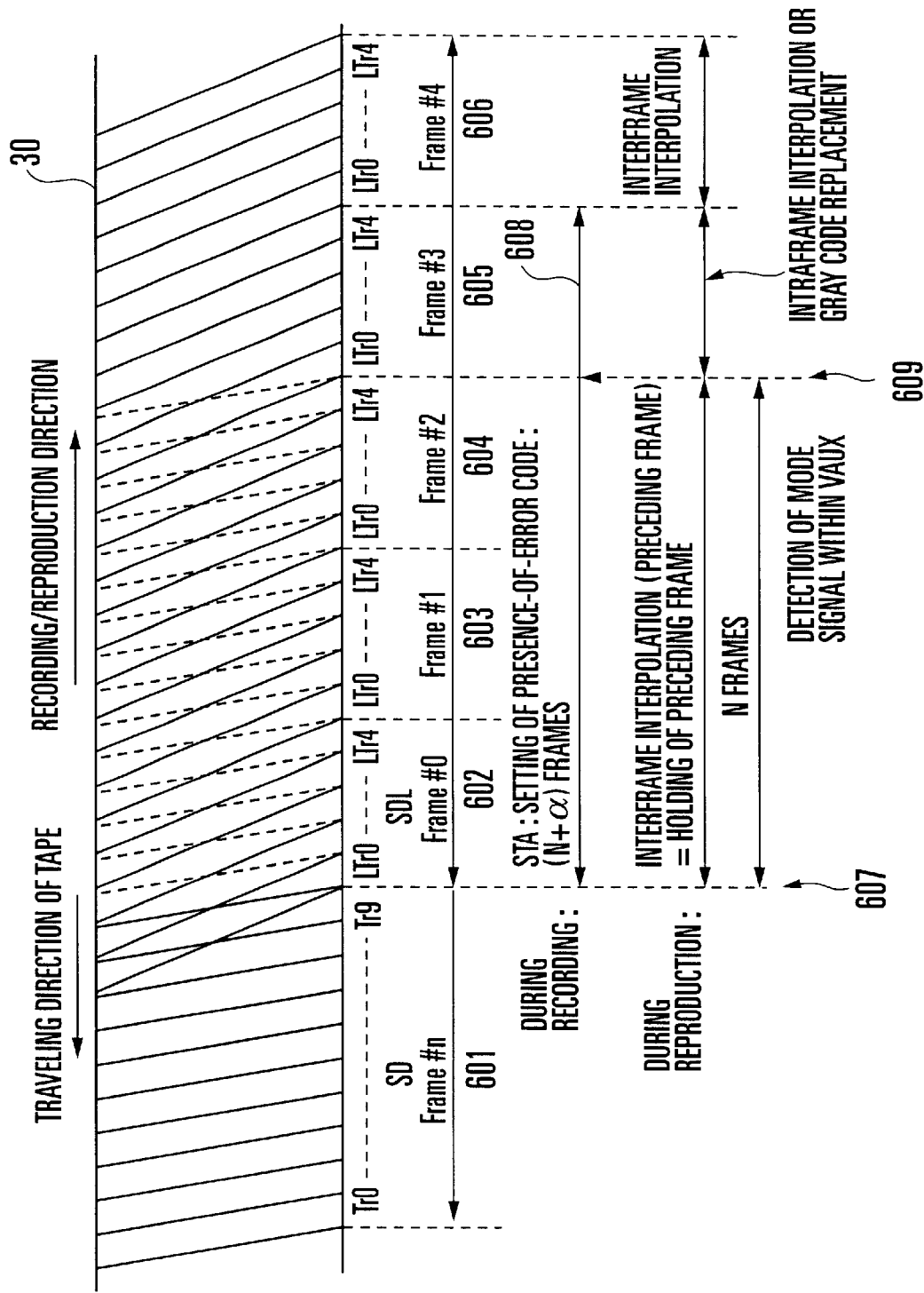
FIG. 6 is a diagram showing a recording format on a magnetic tape.

FIG. 6 is a diagram showing a track pattern on the magnetic tape 30, which is used as a recording medium. In the case of FIG. 6, in an area 601, data is recorded in the SD mode, and in areas 602, 603, 604 and 606, data is recorded in the SDL mode.

In the SDL mode, the tape speed at the time of recording is lowered to ½ of the tape speed of the SD mode. Therefore, as shown in FIG. 6, the inclination of tracks of the SD mode differs from that of the SDL mode. As a result of this difference, at a continuing part of the tape where a mode transition takes place from the SD mode to the SDL mode, a part of data in the tracks located in the latter half portion of the last frame of the SD mode is overwritten and overlapped with the data in the tracks formed in the SDL mode, as shown in FIG. 6.

The present embodiment is arranged to avoid any disturbance or deterioration of reproduced images that results from the overlapping of tracks or a delay in the mode transition at the time of reproduction, by means of the error information signal STA.

The error information signal STA is set in the following manner. In recording, the selection between the SD mode and the SDL mode is made by the user by operating the operation switch part 8. This operation is detected by the system control CPU 32. The system control CPU 32 then causes each applicable parts to act according to the mode selected.

As shown, by way of example, in an area 601 in FIG. 6, in a case where the VCR 100 is operating in its normal state, i.e., in the SD mode in the case of the present embodiment, the system control CPU 32 causes a code "0000" indicative of the absence of any error to be stored in the STA area of the macro block shown in FIG. 4.

Then, if the user changes the recording mode from the SD mode to the SDL mode, for example, at a point of time 607 shown in FIG. 6, the system control CPU 32 detects the mode change-over desired by the user. After the detection, the system control CPU 32 causes a code of four bits. "1111" indicative of the presence of any error to be stored in the STA areas of macro blocks (MB) throughout a period 608 of several frames following the point of time 607, for example, covering four frame areas 602, 603, 604 and 605. In an area 606 and subsequent areas following the area 605, since the tape transport system is considered to be in a normal stable state in the SDL mode, the system control CPU 32 causes the four-bit code "0000" indicative of the absence of any error to be stored in the STA area of each macro block (MB).

A reproducing action to be performed in a case where the code indicative of the presence of any error has been stored in the STA area of each macro block (MB) over the several frames obtained immediately after the mode change-over, as described above, is next described as follows.

Figure 7:
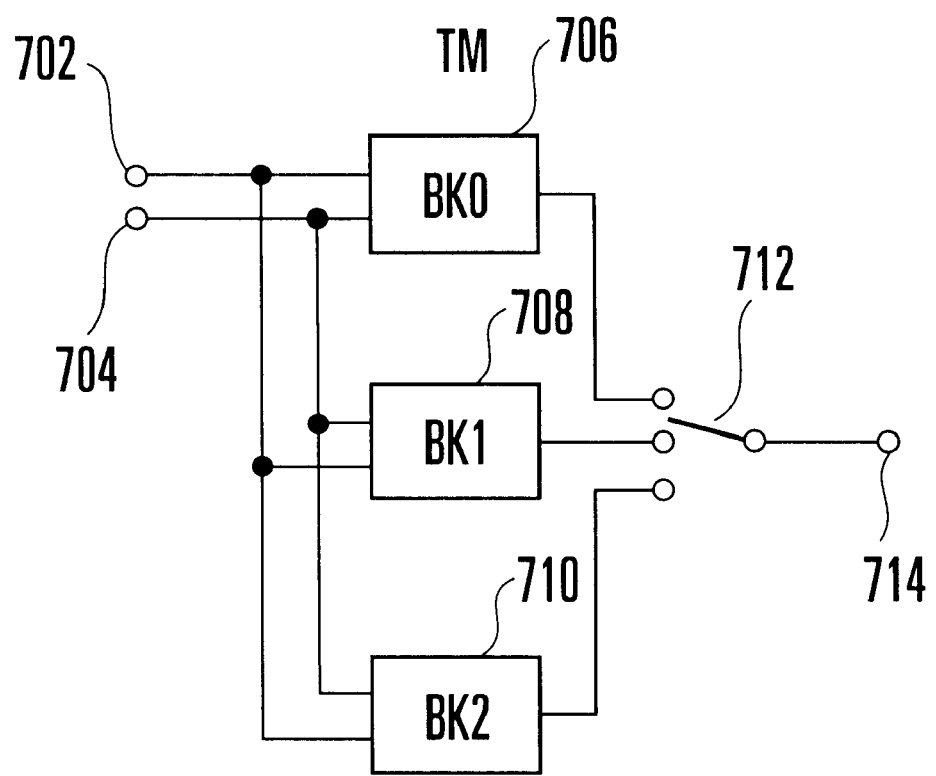
FIG. 7 is a diagram conceptually showing the arrangement of an interpolation processing circuit.

FIG. 7 conceptually shows the arrangement of an interpolating circuit for interpolating image data at the time of reproduction. The following description is given on the basis of the conceptual diagram shown in FIG. 7. It is, however, assumed that, in the VCR shown in FIG. 1, the system control CPU 32 is arranged to carry out the same processes as those shown in FIG. 7 by controlling addresses to be used by the coding/decoding circuit 16 in reading data from the TM area for decoding.

In the case of the present embodiment, an interpolation process is performed on compressed data in the TM area before decoding. In the interpolating circuit shown in FIG. 7, the TM area has a storage capacity for a three-frame amount of data. In other words, the TM area is composed of three banks.

Referring to FIG. 7, the interpolating circuit is provided with an input terminal 702 for receiving data from the coded data input/output circuit 20 and another input terminal 704 for receiving data from the error correction circuit 18. The terminals 702 and 704 are thus arranged to be supplied with information including addresses obtained by adjusting a memory access request and converted into a real address of the memory 28 by the address conversion circuit 24 and image data which is received from the error correction circuit 18 before decoding. In FIG. 7, reference numerals 706 and 708 respectively denote memory banks BK0 and BK1 of the TM area. Reference numeral 710 denotes a memory bank BK2 for performing preceding-frame interpolation. Each of the memory banks BK0, BK1 and BK2 is capable of storing an amount of coded image data for one frame. Access requests for writing and reading into and from the three memory banks BK0, BK1 and BK2 are sent as BK information from the system control CPU 32 to each of the processing circuits as applicable. The access requests are controlled to have them reflected by a higher order address. A switch 712 is arranged to be controlled also by the system control CPU 32, as in the memory banks BK0, BK1 and BK2, in association with a reading action on each of the memory banks BK0, BK1 and BK2. The output of the switch 712 is sent from a terminal 714 to an applicable processing circuit, for example, to the coding/decoding circuit 16 to be expanded and then to be written into an applicable part of the VM area.

Figure 8:
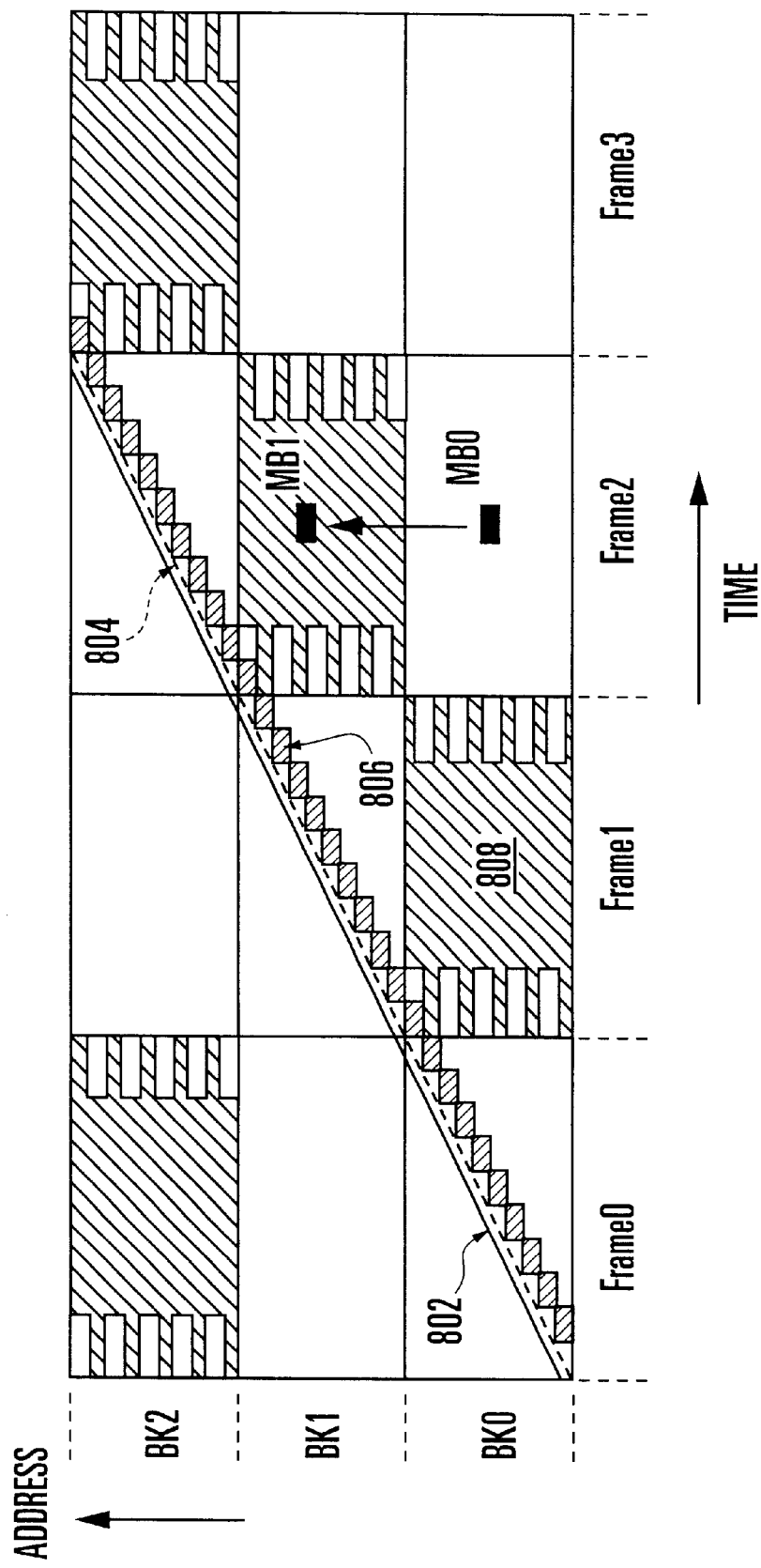
FIG. 8 is a diagram showing the manner of change-over of memory banks of the circuit shown in FIG. 7.

FIG. 8 is a schematic diagram showing the access action of each processing circuit 16, 18 or 20 onto the memory banks BK0, BK1 and BK2 at the time of reproduction. In FIG. 8, an ordinate axis indicates addresses including, in each memory bank, track numbers, synchronous block numbers and symbol numbers arranged in units of byte data. An abscissa axis indicates time. On the abscissa axis, each of symbols Frame0, Frame1, Frame2 and Frame3 denotes a frame period of $\frac{1}{30}$ sec. A full line 802 indicates the writing action on reproduced data by the coded data input/output circuit 20, in which the reproduced data is written into the memory banks BK0, BK1 and BK2 according to linear addressing. A broken line 804 indicates an action of the error correction circuit 18 performed to read out, for syndrome computation, the reproduced data written in by the coded data input/output circuit 20. In the reading action 804, the error correction circuit 18 gains access to the memory banks BK0, BK1 and BK2 according to the linear addressing temporally delayed by one track with respect to the writing phase of the coded data input/output circuit 20.

A square area 806 indicates an action performed after a delay by one track, with respect to the reading action for the syndrome computation, to read out a specific block, if some error is detected from the result of the syndrome computation, to add some correction data to the specific block to correct errors and, after that to write the block to its original position on the memory. In the case of the present embodiment, data within one track is reliably processed for error correction within the period of time of one track. In the event of any error that is beyond a correctable limit, the error correction circuit 18 rewrites, in units of macro block (MB), the 4-bit code of the error information signal STA shown in FIG. 4 into a code indicative of the presence of any error. This code permits any interpolation process to be performed later as necessary.

A hatched area 808 indicates a processing action to be performed by the coding/decoding circuit 16 on compressed image data obtained by correcting any errors of reproduced data before decoding. The processing action is performed to read the data from the memory bank BK0, BK1 or BK2 as applicable, after a temporal delay by one frame, and to decode the data back to the original image data, normally, in units of five macro blocks (MBs). However, since this action is carried out by a shuffling process whereby five MBs of an even-number track and five MBs of an odd-number track are alternately processed, some parts of the area temporally remain absolutely not accessed as shown in FIG. 8.

An interpolating action to be performed in reproducing image data normally recorded in the SD mode, as in the case of the area 601 shown in FIG. 6, is next described. Normally, within this area, the code indicative of the absence of any error is stored in the STA area at the time of recording. However, if the reproduced data is found to have any error that is not correctable by the error correcting process of the error correction circuit 18, the error information signal of the STA area has been converted into the code indicative of the presence of any error. In that case, therefore, the error information signal is detectable by the decoding process of the coding/decoding circuit 16 performed on the memory bank BK1 during the frame period Frame2.

If the code indicative of the presence of any error is detected from the STA area in reading the error-corrected image data, the coding/decoding circuit 16 gains access to the corresponding address of the memory bank of a frame preceding the current frame by one frame, and thus replaces the macro block (BM) having the error with data of the macro block of the same position in the preceding frame. The error data thus can be interpolated with the data of the frame preceding by one frame.

Next, an interpolating action to be performed in reproducing image data from the areas 602, 603, 604 and 605 after transition from the SD mode to the SDL mode is described below.

As mentioned above, while the system control CPU 32 is arranged to constantly monitor an SD/SDL mode signal included in the reproduced data, the operation mode can not be changed from one over to another until the SD/SDL mode signal is completely reproduced. In the case shown in FIG. 6, while, in respect of recorded data, the area 601 which is of the SD mode shifts to the areas 602, 603, 604 and 605 which are of the SDL mode, the tape speed and the rotational frequency of the rotary drum remain in the previous mode (the SD mode in this case) until the above-stated SD/SDL mode signal is detected.

Therefore, the reproducing head scans a plurality of recording tracks corresponding to the SDL mode over several frame areas including the area 602 and subsequent areas, as shown with broken lines in FIG. 6. As a result, it becomes difficult to stably obtain reproduced data because of the relation of scanning to the recording azimuth.

In other words, it is extremely difficult to quickly and stably reproduce the mode signal at the time immediately after the transition of the recording mode. As a result, a period of time corresponding to several frames is required until the transition of the recording mode becomes recognizable by the system control CPU 32.

In view of this problem, the present embodiment is arranged such that, with a period of three frames assumed to be necessary until the recognition of the transition of the recording mode by the system control CPU 32 after the actual transition of the recording mode, as shown in FIG. 6, the 4-bit code indicative of the presence of any error is stored and recorded, at the time of recording, in the STA areas over four consecutive frame periods after the time point 607 at which the recording in the SDL mode begins.

Then, at the time of reproduction, since the code indicative of the presence of any error was forcibly added to the STA area of the macro block (MB) in each of the areas 602, 603, 604 and 605 at the time of recording, the interpolating process with data of the preceding frame is ordinarily carried out irrespective of the recognition of the transition of the recording mode by the system control CPU 32. Accordingly, in the areas 602, 603 and 604, image data of one frame is interpolated, as it is, by using image data of the last frame of the SD mode, which is the preceding mode.

The system control CPU 32 recognizes the transition of the recording mode at a point of time 609 shown in FIG. 6. With the transition of the recording mode recognized by the system control CPU 32, the operating mode of each of the processing circuits including a tape driving system shifts to the SDL mode.

At the tape driving system, however, its operating mode mechanically shifts. Therefore, in actuality, the tape speed, the rotational frequency of the rotary drum, etc., gradually change. In the case of the present embodiment, the interpolation process in the area 605 is arranged to be performed by replacing any error block with data of an adjacent macro block (MB) within the same frame. For example, the interpolation data is obtained by generating the address of the adjacent track and that of the adjacent synchronous block located within the same frame in which the error block data to be interpolated exists.

Another interpolating method applicable to the area 605 and subsequent areas is described as follows. In a case where a replacing process is selected as a mode of interpolation for the area 605 by an external setting means (not shown), the decoding process by the coding/decoding circuit 16 is not performed on any error block. The error block is replaced with fixed data having a luminance signal component at a value of "10" and a color-difference signal component at a value of "128", as a result of decoding the macro block (MB) having an error, and the fixed data is then rewritten to the applicable address within the VM area. The rewriting process is carried out under the memory writing address control of the system control CPU 32 as mentioned in the foregoing. It goes without saying that the area 605 may correspond to a plurality of frames in stead of only one frame.

An interpolation process to be performed for the area 606 and subsequent areas is next described. The system control CPU 32 monitors time elapsing from the point of time 609 shown in FIG. 6. When a length of time required by each of the processing circuits, including the tape driving system, for the complete transition to the SDL mode is judged to have elapsed, the system control CPU 32 controls and causes applicable circuits to carry out the same interpolating process as the process performed for the areas 601 to 604.

The system control CPU 32 manages, in the lump, the phase relation of addresses to be accessed respectively by the image data input/output circuit 12, the audio processing circuit 14, the coding/decoding circuit 16, the error correction circuit 18 and the coded data input/output circuit 20. FIG. 9 shows the phase relation among the addresses of the memory banks BK0, BK1 and BK2. The address control is performed as follows. During the frame period Frame0, the coded data input/output circuit 20 and the error correction circuit 18 are allowed to gain access to the memory bank BK0, the ordinary processing of the coding/decoding circuit 16 is allowed to gain access to the memory bank BK2, and the interpolation processing of the coding/decoding circuit 16 is allowed to gain access to the memory bank BK1. During other frame periods Frame1 and Frame2, the address control is also performed in such a way as to preclude occurrence of contention with each other among different processes for writing and reading. The access to the memory 28 in carrying out these processes is controlled through the priority adjustment of access requests and the address conversion by the address conversion circuit 24 and an access processing action of the memory I/F 26 performed to process access to the memory 28.

The above-described embodiment represents only one example of the invention. The arrangement of processes disclosed applies not only to the NTSC system signals but also to signals of the PAL system and further to signals of the so-called high-definition (HD) system.

In the above-described embodiment, the processes to be performed in the case of change-over of the recording mode from the SD mode to the SDL mode while the recording in the SD mode is in process are described. However, in accordance with the invention, the transition from the SDL mode to the SD mode while the recording in the SDL mode is in process can be processed also in the same manner as described.

Further, while the arrangement for change-over of the recording mode from the SD mode to the SDL mode while the recording in the SD mode is in process is described in the foregoing, the invention likewise applies to a case where the change-over of the recording mode is arranged to be carried out in the following manner. The recording in the SD mode is put to a pause. While the recording is in pause, the recording mode is changed from the SD mode over to the SDL mode. Then, after the change-over of the recording mode, the recording is allowed to be carried on in the SDL mode.

What is claimed is:

1. A recording and reproducing apparatus, comprising:
   recording means for recording, on a recording medium, image data and error information indicative of presence or absence of any error in the image data;
   reproducing means for reproducing the image data and the error information from the recording medium;
   interpolating means for interpolating the reproduced image data on the basis of the error information reproduced by said reproducing means;
   mode change-over means for changing over a recording mode between a first recording mode in which said recording means records the image data and the error information while transporting the recording medium at a first speed and a second recording mode in which said recording means records the image data and the error information while transporting the recording medium at a second speed different from the first speed; and
   control means for controlling and causing, in response to the change-over of the recording mode effected by said mode change-over means, said recording means to record the error information indicative of the presence of any error together with the image data for a predetermined period of time.

2. An apparatus according to claim 1, wherein said interpolating means includes a memory, and memory control means for controlling writing and reading of the reproduced image data into and from said memory according to the error information.

3. An apparatus according to claim 2, wherein said memory stores the reproduced image data for a plurality of frames, and said memory control means reads out, in place of an error in the reproduced image data, image data of a frame adjacent to a frame including the error, from said memory according to the error information.

4. An apparatus according to claim 1, wherein said control means controls and causes said recording means to record the error information indicative of the presence of any error for a predetermined period of time and, then, record, together with the image data, the error information indicative of the absence of any error.

5. An apparatus according to claim 1, further comprising error correction means for correcting an error in the reproduced image data, wherein said error correction means changes contents of the reproduced error information according to a result of correction of the error, and said interpolating means interpolates the reproduced image data according to the error information changed by said error correction means.

6. An apparatus according to claim 1, wherein said recording means divides the image data for one frame into a plurality of blocks each having a predetermined amount of image data, adds the error information to every one of the plurality of blocks and records the added error information together with the image data.

7. An apparatus according to claim 1, wherein the recording medium includes a magnetic tape, and said recording means forms a number of tracks on the magnetic tape with a rotary head and records the image data for one frame in a plurality of tracks on the magnetic tape.

8. A recording and reproducing apparatus, comprising:
   recording means for compressing an amount of information of input image data and for recording, on a recording medium, the compressed image data and error information indicative of presence or absence of any error in the image data;
   reproducing means for reproducing the image data and the error information from the recording medium;
   interpolating means for interpolating the reproduced image data on the basis of the error information reproduced by said reproducing means;
   mode change-over means for changing over a recording mode between a first recording mode in which said recording means forms first image data having a first amount of information per frame by compressing the input image data and records the first image data and the error information and a second recording mode in which said recording means forms second image data having a second amount of information different from the first amount of information per frame by compressing the input image data and records the second image data and the error information; and
   control means for controlling and causing, in response to the change-over of the recording mode effected by said mode change-over means, said recording means to record the error information indicative of the presence of any error together with the image data for a predetermined period of time.

9. An apparatus according to claim 8, wherein said interpolating means includes a memory, and memory control means for controlling writing and reading of the reproduced image data into and from said memory according to the error information.

10. An apparatus according to claim 9, wherein said memory stores the reproduced image data for a plurality of frames, and said memory control means reads out, in place of an error in the reproduced image data, image data of a frame adjacent to a frame including the error, from said memory according to the error information.

11. An apparatus according to claim 8, wherein said control means controls and causes said recording means to record the error information indicative of the presence of any error for a predetermined period of time and, then, record, together with the image data, the error information indicative of the absence of any error.

12. An apparatus according to claim 8, further comprising error correction means for correcting an error in the reproduced image data, wherein said error correction means changes contents of the reproduced error information according to a result of correction of the error, and said interpolating means interpolates the reproduced image data according to the error information changed by said error correction means.

13. An apparatus according to claim 8, wherein said recording means divides the image data for one frame into a plurality of blocks each having a predetermined amount of image data, adds the error information to every one of the plurality of blocks and records the added error information together with the image data.

14. An apparatus according to claim 8, wherein the recording medium includes a magnetic tape, and said recording means forms a number of tracks on the magnetic tape with a rotary head and records the image data for one frame in a plurality of tracks on the magnetic tape.

15. A recording apparatus, comprising:

recording means for recording, on a recording medium, input image data and error information indicative of presence or absence of any error in the image data;

mode change-over means for changing over a recording mode between a first recording mode in which said recording means records the image data and the error information while transporting the recording medium at a first speed and a second recording mode in which said recording means records the image data and the error information while transporting the recording medium at a second speed different from the first speed; and control means for controlling and causing, in response to the change-over of the recording mode effected by said mode change-over means, said recording means to record the error information indicative of the presence of any error together with the image data for a predetermined period of time.

16. A recording apparatus, comprising:

recording means for compressing an amount of information of input image data and for recording, on a recording medium, the compressed image data and error information indicative of presence or absence of any error in the image data;

mode change-over means for changing over a recording mode between a first recording mode in which said recording means forms first image data having a first amount of information per frame by compressing the input image data and records the first image data and the error information and a second recording mode in which said recording means forms second image data having a second amount of information different from the first amount of information per frame by compressing the input image data and records the second image data and the error information; and control means for controlling and causing, in response to the change-over of the recording mode effected by said mode change-over means, said recording means to record the error information indicative of the presence of any error together with the image data for a predetermined period of time.

17. A recording and reproducing apparatus, comprising:

recording means for recording, on a recording medium, image data and additional information relating to the image data;

reproducing means for reproducing the image data and the additional information from the recording medium;

interpolating means for interpolating the reproduced image data on the basis of the additional information reproduced by said reproducing means;

mode change-over means for changing over a recording mode between a first recording mode in which said recording means records the image data and the additional information while transporting the recording medium at a first speed and a second recording mode in which said recording means records the image data and the additional information while transporting the recording medium at a second speed different from the first speed; and control means for setting the additional information to a predetermined code in response to the change-over of the recording mode effected by said mode change-over means, and for controlling and causing said recording means to record the additional information set to the predetermined code together with the image data for a predetermined period of time.

18. A recording and reproducing apparatus, comprising:

recording means for compressing an amount of information of input image data and for recording, on a recording medium, the compressed image data and additional information relating to the image data;

reproducing means for reproducing the image data and the additional information from the recording medium;

interpolating means for interpolating the reproduced image data on the basis of the additional information reproduced by said reproducing means;

mode change-over means for changing over a recording mode between a first recording mode in which said recording means forms first image data having a first amount of information per frame by compressing the input image data and records the first image data and the additional information and a second recording mode in which said recording means forms second image data having a second amount of information different from the first amount of information per frame by compressing the input image data and records the second image data and the additional information; and control means for setting the additional information to a predetermined code in response to the change-over of the recording mode effected by said mode change-over means, and for controlling and causing said recording means to record the additional information set to the predetermined code together with the image data for a predetermined period of time.

19. A recording and reproducing apparatus, comprising:

recording means for recording, on a recording medium, image data and additional information indicative of a state of the image data;

reproducing means for reproducing the image data and the additional information from the recording medium;

memory control means for writing the reproduced image data into a memory, said memory control means varying a writing action of said reproducing means on said memory according to the additional information reproduced by said reproducing means;

mode change-over means for changing over a recording mode of said apparatus between a plurality of recording modes; and control means for setting the additional information to a predetermined code in response to the change-over of the recording mode effected by said mode change-over means, and for controlling and causing said recording means to record the additional information set to the predetermined code together with the image data for a predetermined period of time.

* * * * *